Sept. 16, 1969                D. R. McNEAL, JR                   3,466,945
             VALVE OPERATING EQUIPMENT PARTICULARLY
                FOR AUTOMATICALLY MODULATED VALVES
Filed Aug. 24, 1967                                    3 Sheets-Sheet 2
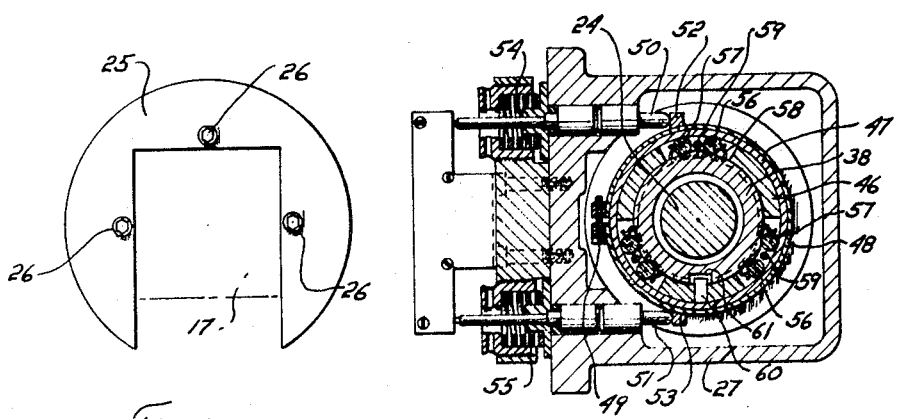
Fig. 1a
Fig. 3
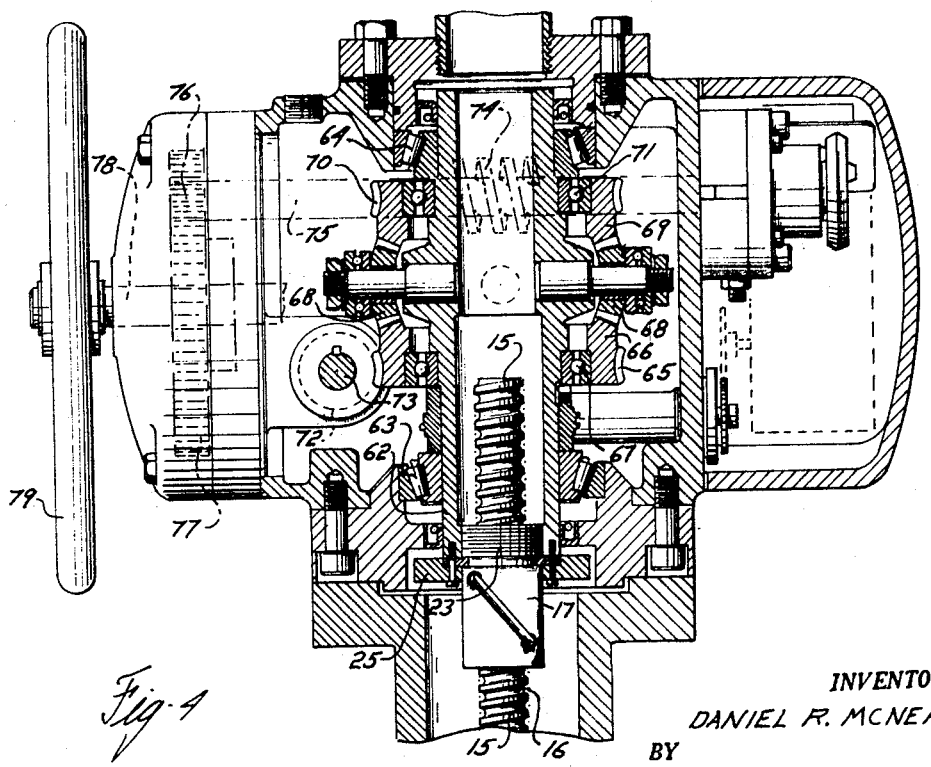
Fig. 4
INVENTOR.
DANIEL R. MCNEAL Jr.
BY
ATTORNEYS //United States Patent Office 3,466,945
Patented Sept. 16, 1969

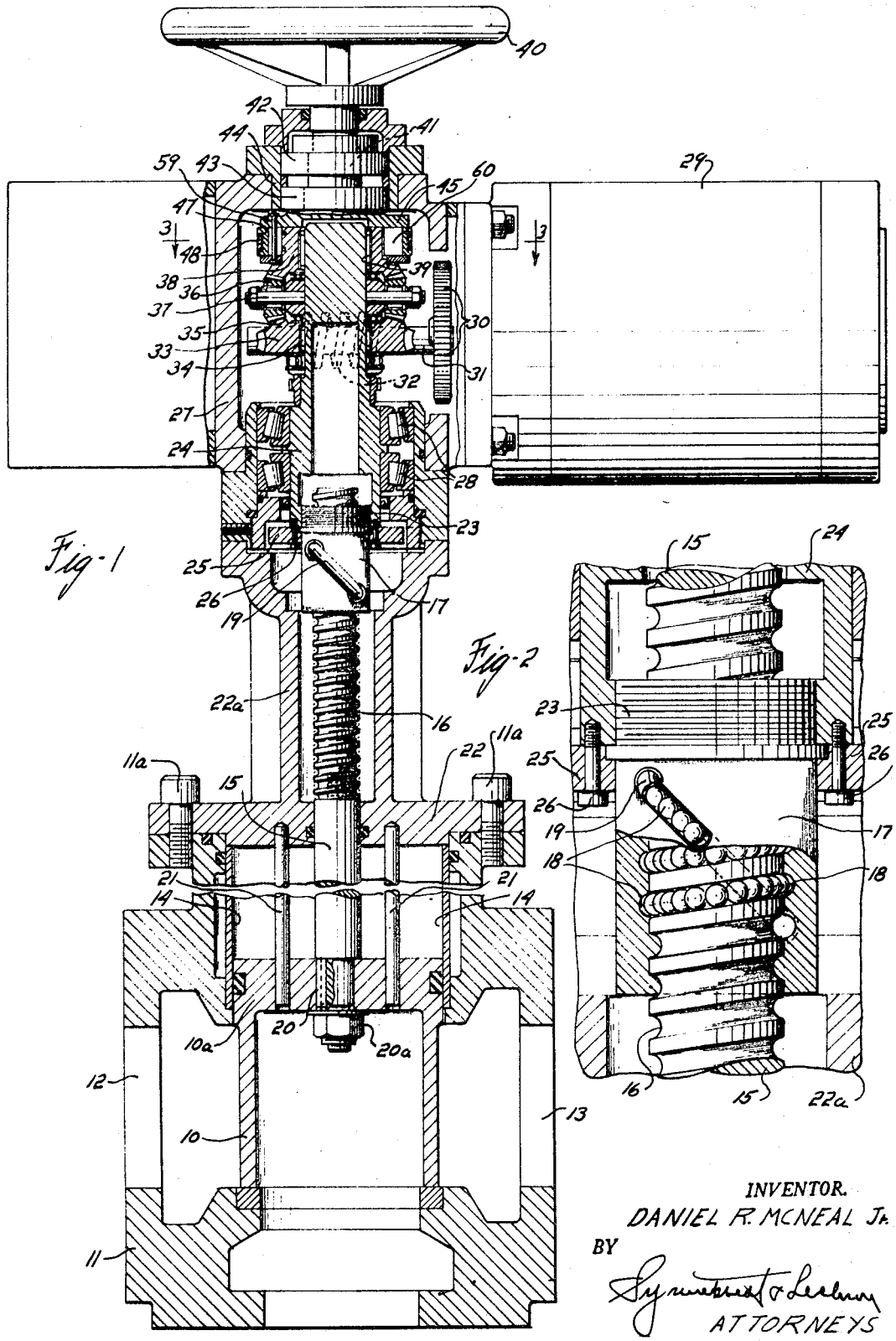

3,466,945
VALVE OPERATING EQUIPMENT PARTICULARLY FOR AUTOMATICALLY MODULATED VALVES
Daniel R. McNeal, Jr., Gwynedd, Pa., assignor to Andale Company, Lansdale, Pa., a corporation of Pennsylvania
Filed Aug. 24, 1967, Ser. No. 663,089
Int. Cl. F16h 1/18
U.S. Cl. 74—625                                   9 Claims

ABSTRACT OF THE DISCLOSURE

Valve operating equipment including a ball screw device having the screw element connected with the valve and restrained as against rotation, but axially shiftable by rotation of the nut element of the ball screw device, and powered reversible mechanism for rotating the nut element in either direction, together with reversible manually operable mechanism for rotating the nut element in either direction.

---

The invention relates to valve operating equipment and is particularly concerned with equipment adapted for use with valves of the kind which are constantly modulated or monitored automatically, for instance by a power operated computer controlled system, such as utilized in gas or other fluid supply lines.

In systems of the kind above mentioned, it is of great importance that the valve closely or accurately, and also quickly, follow the control signals received by the power operating mechanism for the valve, and that the valve follow the action of the power operating mechanism, virtually without lost motion. Ordinarily in a system of this kind, the valve actuating element itself comprises a shaft or spindle which effects opening and closing movement of the valve by axial displacement movement. On the other hand, the output or drive element of the power operating mechanism ordinarily is a rotative element. Heretofore, a simple screw connection was introduced between the rotative output or drive element of the power operating mechanism and the axially displaceable actuating element for the valve, but such screw connections are inherently characterized by high friction and frequently also by substantial lost motion so that the valve response does not easily and closely follow the dictates of the power operating mechanism.

With the foregoing in mind, the invention contemplates the introduction of a "ball screw device" between the rotative drive element of the power operating mechanism and the valve itself. Such a ball screw device comprises a screw element, a nut element, and intervening balls arranged to travel, usually in an endless path a portion of which lies between the screw and nut elements, as will appear more fully hereinafter.

The invention contemplates connection of the screw device to the valve to be operated and the provision of means providing against rotation of the screw device while permitting axial displacement to effect opening and closing movements of the valve. Means are provided for restraining axial movement of the nut element of the ball screw device and provision is made for rotating the nut element, in consequence of which the rotative motion of the nut element is converted to axial displacement of the screw element through and by the action of the interposed balls.

This type of connection between the power operating mechanism and the valve, together with certain types of valve operating mechanisms to be described, is uniquely suited to meet the problems of an automatic or computer modulated valve operating system, because of the fact that the ball screw device reduces friction of an insignificant level and virtually eliminates lost motion in the valve operating connection. At the same time, however, the introduction of the ball screw device gives rise to certain other problems because of the fact that, notwithstanding the relatively low effective pitch angle of the ball screw device, the device is quite freely reversible, i.e., will convert axial loads on the valve and the valve operating element into rotative motion of the nut element of the ball screw device.

In view of the foregoing, the invention further contemplates employment of a power operating mechanism, preferably including a reversible motor and an operating connection between the motor and the nut element of the ball screw device, which operating connection is irreversible, i.e., will not transmit rotative forces from the nut element back to the motor.

A further object of the invention is to provide a power operating mechanism for a valve in which provision is made for shutting off the operating power in the event of the valve sticking or in the event of some valve operating part becoming jammed, thereby avoiding damage to the valve or to operating parts. At the same time, the invention contemplates further provision for protection of the valve and operating parts by incorporation in the operating mechanism of a torque limiting slip clutch in a novel manner, as will further appear.

Still further, in accordance with another aspect of the invention, provision is made for operating the valve, not only by the automatic power mechanism, but also by manual mechanism. Because of the inherent reversible characteristic of the ball screw device, the invention still further contemplates introduction of means, associated with the manual operating mechanism, for preventing forces originating in the valve from being transmitted back to the hand operated element of the operating mechanism. This last purpose may be achieved in different ways, by different mechanisms, as will further appear from the explanation of the several embodiments hereinafter described with reference to the accompanying drawings.

The invention also contemplates certain special arrangements associated with the ball screw device and providing, among other things, for handling of the thrust loads on the nut element of the ball screw device separately from the rotative drive element of the valve operating mechanism, and also for a novel lubrication system for the balls employed in the ball screw device.

How the foregoing objects and advantages are attained will appear more fully from the accompanying drawings illustrating three embodiments of the invention, in which FIGURE 1 is an axial sectional view taken through a valve, valve operating system and a ball screw interconnection between the operating system and the valve, arranged in accordance with the invention;

FIGURE 1a is a view of certain details of the connection between the valve operating mechanism and the nut element of the ball screw device;

FIGURE 2 is an enlarged fragmentary sectional view of certain parts of the ball screw interconnection between the valve operating system and the valve;

FIGURE 3 is a transverse sectional view taken as indicated by the section line 3—3 on FIGURE 1;

FIGURE 4 is a fragmentary sectional view similar to FIGURE 1, but illustrating second embodiment.

Figure 5:
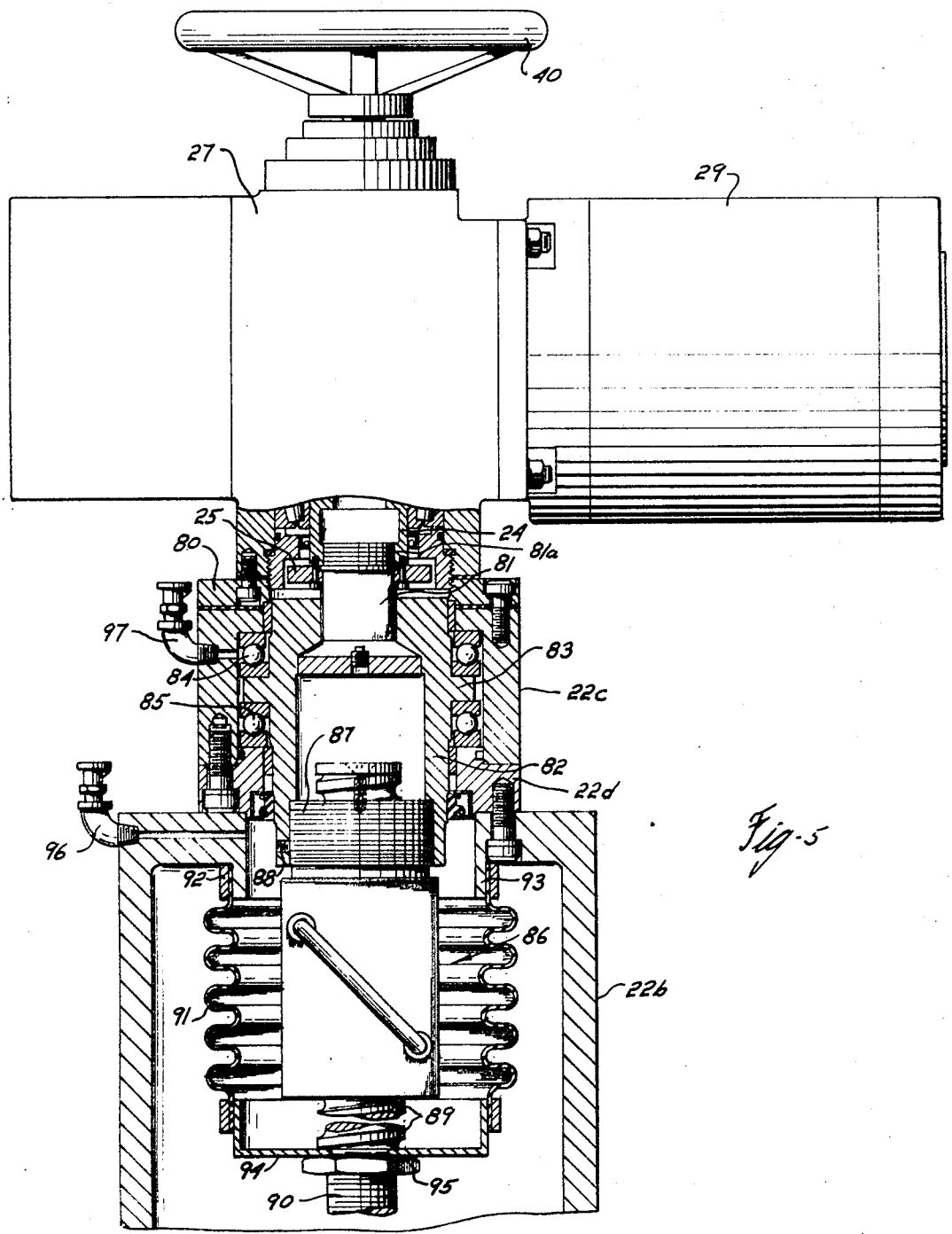
FIGURE 5 is a view, partly in elevation and partly in axial section of a third embodiment in which a valve operator similar to that of FIGURE 1 is employed but in which the ball screw device is differently arranged.

Turning to the embodiment illustrated in FIGURES 1, 2 and 3, attention is first directed to the lower portion of FIGURE 1 which illustrates a typical valve to be controlled, for instance the vertically reciprocable valve 10 arranged in a valve body 11 and adapted to control fluid flow through the body, for instance between the ports indicated at 12 and 13 at opposite sides of the valve body. The valve is illustrated in FIGURE 1 as fully closed. This valve may be opened by vertically upward sliding movement within the guide sleeve 14. In many installations involving automatic valve modulation, the valve would ordinarily be at least partially open and the extent of opening would be under constant monitoring by the power operating mechanism, for instance under the control of a computer.

The valve shown in FIGURE 1 is adapted to be raised and lowered by the axially shiftable shaft 15, the upper end of which is provided with a helical ball race 16 (see FIGURES 1 and 2), the upper end of the shaft thus constituting the screw element of a ball screw device which further comprises a nut element 17 having therein an internal helical race complementary to the race 16 so that a series of balls 18 may ride in portions of the two helical ball races which are in registry with each other. The opposite axial ends of the internal ball race within the nut 17 are interconnected by a tube 19, forming with the helical race within the nut, an endless ball raceway in which the series of balls may move in either direction during relative rotation and relative axial displacement of the ball screw and ball nut. Preferably the endless raceway just referred to is substantially filled with balls 18.

In order to secure the contemplated operation from this valve operating mechanism, the screw element or shaft 15 of the ball screw device is connected with the valve 10, for instance by the key 20 and clamping nut 20a, thereby providing against relative rotation of the shaft 15 with respect to the valve 10. Rotation of the valve itself is prevented by means of the vertical guide pins 21 projecting downwardly from the fixed structure 22 and positioned to enter apertures in the end portion 10a of the valve 10. In this way, it is assured that the screw element or shaft 15 of the ball screw device will be restrained as against rotation.

The upper end of the nut element 17 of the ball screw device is externally threaded as indicated at 23, this threaded portion being received in the internally threaded lower end of the hollow drive shaft 24 of the valve operating mechanism. This threaded connection provides against axial displacement of the nut element 17.

In order to assure that the nut element 17 turns or rotates with the drive shaft 24 of the valve operating mechanism, the exterior of the nut 17, at least toward the upper end thereof, is of square cross section (see FIGURE 1a) and is received within a squared recess formed in a yoked shaped member 25 which is secured to the lower end of the drive shaft 24 by studs indicated at 26.

By virtue of the construction just described, the rotative position of the nut element 17 of the ball screw accurately follows the rotation of the drive shaft 24 of the operating mechanism, and at the same time the nut 17 is restrained as against relative axial displacement with respect to the drive shaft 24. Therefore, rotation of the drive shaft 24 causes rotation of the nut 17 and this results in axial displacement of the screw element and shaft 15, which latter closely and easily follows the control motions because of the virtual elimination of lost motion and friction in the operating connection between the drive shaft 24 and the valve itself. As the valve is lifted from the position shown in FIGURE 1, the screw element 15 rises within the hollow interior of the drive shaft 24.

The power shaft 24 is journaled within the fixed structure or housing 27 by means of tapered roller bearings 28—28. The structure 27 is connected with the fixed part 22 through the intermediate fixed sleeve 22a, so that all of parts 27, 22a and 22 are rigidly secured to the valve body 11, as by studs 11a. The power mechanism for operating the drive shaft 24 and thus the valve itself comprises a motor indicated at 29 connected through gearing 30 to the shaft 31 of a worm 32 meshing with a worm wheel 33 which is journaled by bearing 34 upon the external surface of the drive shaft 24. This worm 33 also carries a bevel planet gear 35 meshing with planet pinions 36 which are mounted on shafts 37 journaled in fixed radial positions on the drive shaft 24. Another bevel planet gear 38 is journaled on the drive shaft 24 by a bearing 39, and it will be understood that if the planet gear 38 is restrained as against rotation, operation of the worm 32, with consequent rotation of the worm wheel 33 and of the planet gear 35, will cause drive shaft 24 to rotate through the action of the planet pinions 36.

The foregoing system constitutes the power drive mechanism for the nut of the ball screw, and it will be noted that this drive system incorporates a worm and worm wheel connection 32–33, it being contemplated that the pitch angle of these parts be selected so that this worm and worm wheel transmission is irreversible, thereby blocking rotative forces occurring in the drive shaft 24 and preventing them from being reversely transmitted through the gearing to the motor 29. This is desirable in the system as disclosed, incorporating the ball screw device, because of the fact that the ball screw device will relatively freely translate axial loads on the valve itself into rotative forces in the nut 17 of the ball screw. Such rotative forces, however, will be absorbed and blocked by the worm 32 and thus will not be transmitted back to the driving motor itself, thereby avoiding adverse influences upon the desired modulation or accurate control of the valve in response to computerized signal inputs to the motor.

The arrangement of the mechanism providing for restraining the planet gear 38 from rotating will be explained below in connection with the description of the manual operating mechanism for the valve. At the top of FIGURE 1 a hand operating wheel 40 is shown, this hand wheel being connected with the shaft 41 which is rotatively mounted by means of bearings 42–43 within the sleeve 44 which is in turn supported in the upper end of the fixed structure or casing 27. The lower end of the manually operable shaft 41 is enlarged as indicated at 45, from which arcuate parts 46 (see particularly FIGURE 3) project in position lying just outside of the central or hub portion of the planet gear 38. The arcuate parts 46 are surrounded by the annular part 47 which, in turn, is surrounded by the friction band 48, the band 48 being split and the two free ends being interconnected by means of the screw 49 providing for adjustment of the tightness of frictional engagement of the band 48 with the sleeve 47.

Rotation of the assembly of the band 48 and thus also of the sleeve 47 is resisted by spring urged plungers 50 and 51 which bear against abutments 52 and 53 projecting from the friction band 48. Springs 54 and 55 urge the plungers 50 and 51 to the right and thus tend to retain the band 48 and the sleeve 47 in a given rotative position.

From FIGURE 3 it will be noted that the assembled relation of the parts 38 (planet gear), 46 (arcuate elements connected with the hand wheel) and 47 (surrounding sleeve) provides a series of arcuately shaped cavities in which pairs of jamming rollers 56 and 57 are positioned. The exterior of the part 38 is provided with pairs of inclined surfaces adjacent to the pairs of jamming rollers, these pairs of surfaces being so inclined that upon relative rotation of the parts 38 and 47 in one direction rollers 56 jam between the parts 38 and 47, whereas relative rotation in the other direction causes rollers 57 to jam between those parts. Double acting spring clip elements 58 yieldingly urge the jamming rollers toward each other, i.e., into jamming positions, and the jamming action is relieved only upon circumferential shifting movement of the pins 59 which are fixed in the enlargement 45 of the shaft 41 of the hand wheel. Because of this, when the hand wheel is turned in one direction, for instance in the clockwise direction as viewed in FIGURE 3, the pins 59 engage the jamming rollers 56, permitting the hand wheel and the connected arcuate parts 46 to move in the clockwise direction independently of the surrounding sleeve 47. Upon slight motion in this direction the drive element or key 60 abuts one end of the arcuate slot 61 formed in the external surface of the hub part of the planet gear 38 and thereby transmits rotative force from the hand wheel to the planet gear 38. At this time, assuming that the wheel 32 is not being driven by the motor 29, the worm wheel 33 and thus also the planet gear 35 will be restrained as against rotation, so that rotation of the hand wheel will cause the drive shaft 24 to turn through the action of the planet pinions 36.

Similarly, upon counterclockwise rotation of the hand wheel, the counterclockwise rotation of the pins 59, when viewed as in FIGURE 3, will cause release of the jamming rollers 57 and, after a small angular motion, will cause rotation of the planet gear 38 through the driving element 60, thereby turning the drive shaft 24 in the other direction.

Analysis of the foregoing mechanism will show that the ultimate reaction point for the power drive system is one or the other of the abutments 52 and 53, depending upon the direction of rotation. This will be understood when it is considered that the planet gear 38 must be restrained as against rotation in order for the power driven worm 32 to cause rotation of the drive shaft 24. With the frictionally interengaged band 48 and ring 47 held nonrotative, for instance by means of the spring pressed plungers 50 and 51, then the planet gear 38 is restrained as against rotation by virtue of the jamming rollers 56 and 57. Having in mind that it is contemplated that the frictional interengagement of the band 48 with the annular member 47 is so tight that under normal operating conditions these two parts move together, it will be seen that during rotation of the power drive in one direction, the rotation of the planet gear 38 is resisted by engagement of the abutment 52 with the plunger 50. If the valve (or any other part of the operating system) should stick and thus require an excessively high torque from the motor in order to move the valve, the force of the abutment 52 on the plunger 50 will shift the plunger and it is contemplated that this action will trip a switch breaking the motor circuit. The same situation exists with reference to powered operation in the opposite direction, in which the abutment 53 becomes the reaction point and, if excessive force is required because of sticking of valve or operating parts, the plunger 51 will shift and thus break the motor circuit. The details of this control and motor shut off mechanism need not be considered herein as they form no part of the present invention per se, and it may here further be noted that certain details of construction of a valve operating mechanism of the general type described above also form no part of the present invention per se, but are described in Bacchi et al. Patent No. 3,218,866 issued Nov. 23, 1965.

The action of the plungers 50 and 51 described above is in the nature of a safeguarding action, which prevents damage to parts of the system in the event of sticking of the valve or malfunction of other parts, the motor automatically being shut off as a result of an excessive rise in the force required to move the valve.

The system described above is also characterized by another safety feature having reference to the power operating system for the valve. As above mentioned the abutments 52 and 53 provided for cooperation with the plungers 50 and 51 are carried on the outer ring 48 which is frictionally engaged with the ring 47. In the event that the motor shut off mechanism which is normally operated by the plungers 50 and 51 does not operate to shut the motor off upon a large increase in load or torque, continued operation of the motor could damage various parts, including not only the motor shut off mechanisms including the plungers 50 and 51, but also other parts of the system and even including the valve itself, but such damage is prevented by the slip clutch 47–48. Excessive increase in load or torque result in slippage of the inner ring 48 within the outer ring 47, and it is contemplated that the adjustment of the screw 49 should be such as to permit slippage within safe tolerance limits with respect to the strength of various structural parts including the valve itself.

In the embodiment illustrated in FIGURE 4, the ball screw device is shown as used with a different form of valve operating mechanism. In this embodiment, instead of employing jamming rollers as in the first embodiment, a different system is employed for restraining rotation of the manually operable planet gear 38 (in FIGURE 1) and thus provide the desired reaction point in the planetary gearing when the valve operator is being controlled by the powered mechanism. Briefly, the way this is accomplished in the embodiment of FIGURE 4 is to provide each of the two planet gears with a worm wheel, and to provide separate power driven and manually operated irreversible worms, respectively cooperating with the two worm wheels.

How this is accomplished will be clear from the description referring to FIGURE 4 and it may here be noted that the type of valve operating mechanism herein shown as used in combination with the ball screw arrangement, is similar to the valve operating mechanism illustrated in the Bacchi Patent No. 3,031,899 issued May 1, 1962.

Although not shown in FIGURE 4, it is assumed that the equipment of the invention is associated with a valve such for example as is shown toward the bottom of FIGURE 1. In the lower portion of FIGURE 4 there is also shown the axially shiftable shaft 15 having the helical ball race 16 formed therein so that the upper portion of the shaft 15 constitutes the screw element of the ball screw device. As in the first embodiment, the nut element 17 of this device is threaded into the lower end of the drive shaft 62 as is indicated at 23. Also as in the first embodiment, the exterior of the nut 17 is squared in order to fit into the squared opening of the yoke member 25 which is fastened to the lower end of the drive shaft 62 in order to provide for rotation of the nut element of the ball screw device with the drive shaft, in the same manner as illustrated in FIGURE 1a.

The drive shaft 62 is journaled by means of bearings 63 and 64. A gear element having one portion 65 formed as a worm wheel and another portion 66 formed as a bevel planet gear is journaled upon the drive shaft by means of bearing 67. The planet gear 66 meshes with a pair of planetary pinions 68 which are mounted and journaled on the drive shaft 62, so as to rotate about axes extended radially from the axis of the drive shaft. The planetary pinions in turn mash with the planet gear portion 69 of a gear also having a worm wheel portion 70, this gearing element also being journaled on the drive shaft 62 by means of a bearing 71.

The planetary gearing system just described is such that if one of the planet gears 66 or 69 is restrained as against rotation and the other one is positively rotated, the drive shaft 62 will be rotated through the action of the planetary pinions 68.

For the purposes just referred to, two worms are provided, one of these being shown at 72, this worm meshing with the worm wheel 65 which is connected with the planet gear 66. The worm 72 is mounted upon a power driven shaft 73, this shaft desirably being connected with a reversible electric motor, for instance in the manner illustrated and described in the Bacchi Patent No. 3,031,899.

The other worm, indicated in dot and dash lines at 74 is actually positioned in front of the plane in which the section in the upper portion of FIGURE 4 is taken. This worm 74 meshes with the worm wheel 70 which is connected with planet gear 69. The worm 74 is mounted on shaft 75 having a pinion 76 cut in the end thereof and meshing with a gear 77 which is mounted upon the shaft 78 of the hand wheel 79.

With respect to both of the worms 72 and 74 it is to be understood that the pitch angle is selected so that each of these worms is irreversible, i.e., will not transmit torque from the associated worm wheel through the worm to the worm mounting shaft. Therefore, these two worms respectively form reaction points for the planetary gearing system when the powered shaft 73 or the hand wheel 79 is operated.

As in the first embodiment, it is contemplated that the powered mechanism for operating the valve, i.e., the motor which will drive the shaft 73 may be controlled, for instance by a computer, in order to constantly monitor a flow condition being regulated by the valve connected through the ball screw device.

In the embodiment of FIGURE 4, notwithstanding the relatively free translation of axial thrusts originating in the valve into torque in the nut element of the ball screw and thus into torque in the drive shaft 62, these forces will be effectively isolated from the motor of the power operating mechanism and from the hand wheel of the manual operating mechanism, because of the presence of the worms 72 and 74 in the two operating systems.

Turning now to the embodiment of FIGURE 5, it is first to be noted that most of the valve operating mechanism is here shown only in outline at the top of the structure, including the motor 29, casing part 27 and hand wheel 40. These parts and others within the casing 27 may be identical with those described above and shown in FIGURES 1 and 3.

At the lower edge of the casing part 27, a ring 80 serves for connection between the casing 27 and the underlying casing part 22c which in turn is connected through ring 22d with the casing part 22b surrounding the ball screw device and performing the same general function or purpose of mounting the valve operating parts upon the fixed structure associated with the valve itself, such as the structure 22 shown in FIGURE 1.

The rotative power shaft 24 of the valve operating mechanism is connected by means of a shaft 81 the upper end of which is threaded at 81a into the lower end of the shaft 24. Below the threaded part 81a the shaft 81 is squared to fit the yoke 25 and also to fit a squared central aperture in the upper end of the sleeve 82, which latter is housed within the casing part 22c. The sleeve 82 is provided with a circumferential rib or ring 83 cooperating with thrust bearings 84 and 85 which serve to transmit axial loads from the sleeve 82 to the casing part 22c and thus to the remainder of the fixed structure associated with the valve and with the valve operating mechanism. The casing part 22c and the associated mechanism thus, in effect, constitutes a "thrust box" which, as will appear below, takes the axial or thrust load on the nut element of the ball screw device incorporated in the system.

The nut element of the ball screw device is generally indicated in FIGURE 5 at 86, the upper end of this nut element having a threaded connection 87 with the rotative sleeve 82, the ball screw nut 86 and the sleeve 82 being restrained as against relative rotation by means of one or more set screws, such as indicated at 88. Axial loads on the ball screw nut are thus transmitted to the sleeve 82 and are absorbed by the bearings 84 and 85.

The screw element of the ball screw device is indicated at 89 in FIGURE 5 and this screw element may be of any appropriate length and at its lower end may be provided with threads 90 for connection with a valve or a valve operating member.

A flexible bellows 91 surrounds the nut element 86 of the ball screw device and has its upper end sealed as at 92 around a lip 93 formed as a part of the casing structure 22b. The lower edge of the bellows 91 is provided with an end closure 94 which is centrally apertured to pass the threaded part 90 of the ball screw 86. A liquid tight joint is preferably provided here by means of a nut 95 threaded onto the part 90.

The bellows 91 and associated parts thus form a lubricant reservoir surrounding the nut element of the ball screw device and this provides an effective lubrication system for the ball screw device, it being contemplated that the reservoir be filled with an oil lubricant, for instance through the fitting 96.

The housing part 22c may serve also as a lubricant reservoir associated with the thrust bearings 84 and 85 and the interior of this reservoir may be filled with lubricant through the fitting 97.

Various of the operating characteristics of the arrangement shown in FIGURE 5 are the same as those described above with reference to the embodiment shown in FIGURES 1, 2 and 3. However, in addition provision is made by means of the thrust bearings 84 and 85 to handle the thrust or axial load on the nut element of the ball screw device independently of the rotative driving member 24 of the valve operating mechanism. This is particularly important in use of the invention with certain types of valves which are constantly monitored, as by a computer, because certain of those valves are normally subject to forces producing a substantial axial load in the screw element of the ball screw device and thus also in the nut element of that device.

The arrangement of the ball screw device, with the nut element connected for powered rotation by the valve operating mechanism, and with the screw element connected with the valve for operation of the valve by axial displacement of the screw element is of importance in combination with the lubrication feature shown in FIGURE 5, i.e., the lubricant reservoir provided by the bellows 91. With the nut and the screw of the ball screw device connected as just described, the screw is not rotative and may therefore be used as one connection point for one end of the bellows which is also connected at its other end to non-rotative structure, namely a portion of the surrounding casing or framing as indicated at 22b.

According to the foregoing, the invention provides valve operating equipment characterized by the ability to accurately reflect control impulses in opening and closing motions of the valve, this action being substantially without lost motion, and with very low friction, due to the connection of the powered operating mechanism with the nut element of the ball screw device to provide for rotation thereof, and due to the connection of the screw element of the ball screw device with the valve to effect valve motion as a result of axial shifting movement of the screw element.

It will be noted, moreover, that in all embodiments illustrated, provision is made for manual operation of the valve, in addition to the powered operation. Still further, in all embodiments provision is made for restraining rotative motions which may tend to occur in the rotative drive shaft of the valve operating mechanism as a result of axial loads on the valve itself, this restraint being achieved in the embodiment of FIGURES 1–3 and in the embodiment of FIGURE 5 by the jamming rollers and the associated structure, and in the embodiment of FIGURE 4 by the employment of an irreversible worm and worm wheel.

I claim:

1. Valve operating equipment including a ball screw device comprising cooperating nut and screw elements with interposed balls, means for restraining the screw element as against rotation, means for connecting the screw element to the valve to be operated and providing for valve operation by reciprocation of the screw element, means for restraining the nut element as against motion axially of the screw element, and mechanism for rotating the nut element comprising reversibly operable manual and power drive mechanisms each providing for rotation of the nut in either direction, the manual drive mechanism including an irreversible driving connection with the nut to provide for manual rotation of the nut while providing against reverse transmission of torque in either sense of rotation from the nut to the manual drive mechanism.

2. Equipment according to claim 1 in which the power drive mechanism includes an irreversible driving connection with the nut to provide for powered rotation of the nut in either direction while providing against reverse transmission of torque in either sense of rotation from the nut to the power drive mechanism.

3. Valve operating equipment including a ball screw device comprising cooperating nut and screw elements with interposed balls, means for restraining the screw element as against rotation, means for connecting the screw element to the valve to be operated and providing for valve operation by reciprocation of the screw element, means for restraining the nut element as against motion axially of the screw element, means for rotating the nut element comprising reversibly operable manual and power drive mechanisms each providing for rotation of the nut in either direction, the manual drive mechanism including a rotative driving member, and mechanism for restraining rotation of said member including releasable jamming means reacting against an abutment and providing against transmission of appreciable torque in either sense of rotation from the nut to said member and thus to the manual drive mechanism and further including a slip clutch between the jamming means and said abutment.

4. Equipment according to claim 3 in which the power drive mechanism includes an irreversible driving connection with the nut to provide for powered rotation of the nut in either direction while providing against reverse transmission of torque in either sense of rotation from the nut to the power drive mechanism.

5. Valve operating equipment including a ball screw device comprising cooperating nut and screw elements with interposed balls, means for restraining the screw element as against rotation, means for connecting the screw element to the valve to be operated and providing for valve operation by reciprocation of the screw element, means for restraining the nut element as against motion axially of the screw element, and mechanism for rotating the nut element comprising reversible power drive means having an irreversible driving connection between the nut and the power drive means to provide for powered rotation of the nut in either direction while providing against reverse transmission of torque in either sense of rotation from the nut to the power drive means.

6. Equipment according to claim 5 in which the driving connection for the nut of the ball screw includes a planetary gearing system incorporating two planet gears, one of which is connected with the power drive means, a manual mechanism for rotating the other of said planet gears, and means for restraining the second planet gear as against rotation to provide for operation of the valve by power drive of the first of said planet gears.

7. Valve operating equipment including a ball screw device comprising cooperating nut and screw elements with interposed balls, means for restraining the screw element as against rotation, means for connecting the screw element to the valve to be operated and providing for valve operation by reciprocation of the screw element, mechanism for rotating the nut element comprising a rotatively mounted driving member connected with the nut element and further comprising reversible power drive means having irreversible driving connection with said rotative member to provide for powered rotation of said member and thus of said nut in either direction while providing against reverse transmission or torque in either sense of rotation from the nut to the power drive means, and thrust bearing means for the nut element for taking axial loads on the nut element independently of the rotative mounting of said driving member.

8. Valve operating equipment including a mounting frame, power mechanism for operating the valve including a power driven member rotatively mounted in said frame, a ball screw device comprising cooperating nut and screw elements with interposed balls, means for restraining the screw element as against rotation, means for connecting the screw element to the valve to be operated and providing for valve operation by reciprocation of the screw element, means for restraining the nut element as against motion axially of the screw element, means for connecting the rotative power driven member with the nut element of the ball screw device, and a lubricant enclosure establishing a lubricant reservoir surrounding the nut element, said enclosure having a tubular wall with an edge thereof connected with said mounting frame and having an edge sealed against the screw element of the ball screw device, and said tubular wall being flexible to accommodate relative axial motion between the screw element and the mounting frame.

9. Valve equipment including a reciprocable valve, and valve operating mechanism comprising a ball screw device comprising cooperating nut and screw elements with interposed balls, means for restraining the screw element as against rotation, means for connecting the screw element to the valve and providing for reciprocation of the valve by reciprocation of the screw element, means for restraining the nut element as against motion axially of the screw element, and mechanism for rotating the nut element comprising reversible power drive means having an irreversible driving connection between the nut and the power drive means to provide for powered rotation of the nut in either direction while providing against reverse transmission of torque in either sense of rotation from the nut to the power drive means.

References Cited

UNITED STATES PATENTS

| 3,304,794 | 2/1967 | Bird | 74—424.8 |
| 2,738,684 | 3/1956 | Shafer | 74—424.8 |
| 2,859,639 | 11/1958 | Bryant | 74—625 |
| 2,933,937 | 4/1960 | Kron et al. | 74—625 |
| 3,218,886 | 11/1965 | Bacchi et al. | 74—626 |

FRED C. MATTERN, Jr., Primary Examiner

W. S. RATLIFF, Jr., Assistant Examiner

U.S. Cl. X.R.

74—424.8